Dec. 17, 1940.     H. F. KLEINFELDT     2,225,417
CUSHIONING AND CENTERING DEVICE FOR JAR MILLS
Filed Oct. 3, 1939
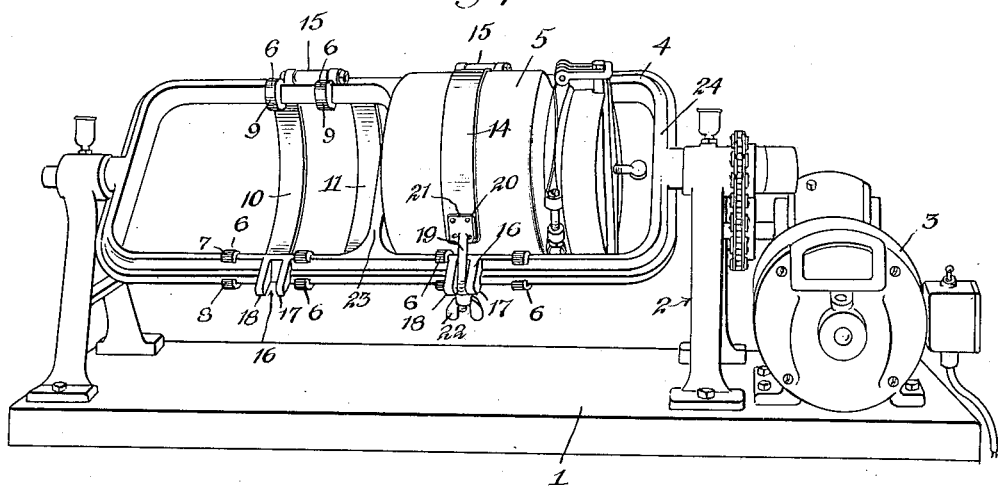
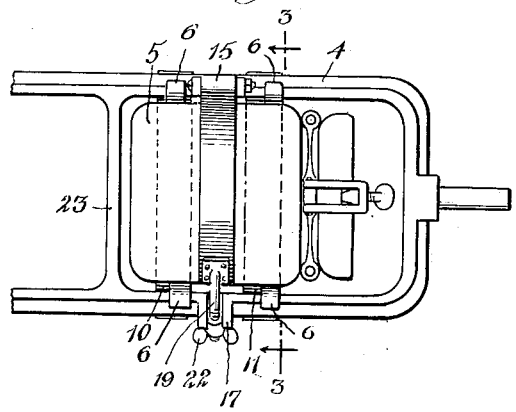
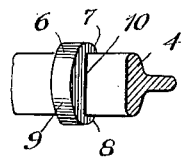
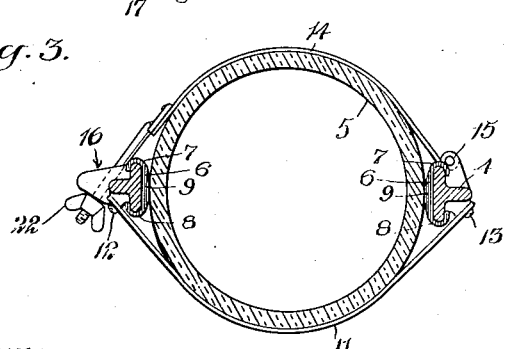
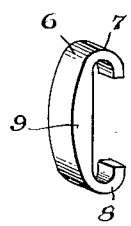
WITNESSES
INVENTOR
Henry F. Kleinfeldt
BY
ATTORNEYS Patented Dec. 17, 1940

2,225,417

UNITED STATES PATENT OFFICE 2,225,417

CUSHIONING AND CENTERING DEVICE FOR JAR MILLS

Henry F. Kleinfeldt, Bloomfield, N. J., assignor to Abbé Engineering Co. Inc., New York, N. Y., a corporation of New York Application October 3, 1939, Serial No. 297,702

3 Claims. (Cl. 83—9)

This invention relates to jar mills and particularly to an improved cushioning and centering device for preventing accidental injury to the jars during the functioning of the mill.

Another object of the invention is to provide in a jar mill cushioning devices carried by parts of the frame and arranged to yieldingly prevent the jar or jars from striking any metal part of the frame.

A further object of the invention is to provide in a jar mill a cushioning and centering structure consisting of one or more rubber cushioning members positioned between the jar of the mill and the frame for supporting the jar.

In the accompanying drawing—

Fig. 1 is a perspective view of a jar mill with a jar therein and cushioning and centering devices embodying the invention applied to the mill;

Fig. 2 is a top plan view of a portion of the frame of the mill shown in Fig. 1 with a plurality of cushioning devices embodying the invention applied thereto;

Fig. 3 is a sectional view through Fig. 2 approximately on the line 3—3;

Fig. 4 is a fragmentary sectional view of part of the frame shown in Fig. 2 with a cushioning member embodying the invention applied thereto; and Fig. 5 is a perspective view of the cushioning member shown in Fig. 4, the same being on a somewhat enlarged scale.

Referring to the accompanying drawing by numerals, 1 indicates the base of the mill 2. The mill 2 is a well known construction and, therefore, forms no part of the present invention except in combination. The mill 2 is driven by a motor 3 or any other desired source of power and the rotary movement is transmitted to the rectangular frame 4. In Fig. 1, a frame 4 has been shown which is adapted to accommodate two jars but only a single jar, namely, jar 5, is illustrated.

As is well known, various materials in a liquid or dry state are placed in the jar 5 and numerous balls are also placed therein. The frame 4 is then rotated which naturally rotates the jar 5. The jar 5 may be of various sizes as desired, according to the kind of material being ground, that shown in Fig. 1 being slightly over eight inches in diameter. A jar of this size is rotated at a speed sufficient to cause the balls in the jar to roll over or cascade down and thereby produce a desired grinding action.

The construction just described is old and well known. However, in mills of this kind quite often the jars become broken and thereby produce not only a loss of the jars but of the material being ground. To obviate this, a number of cushioning members 6 have been provided. As shown in Fig. 5, the cushioning members 6 are made of rubber and are provided with hook-shaped ends 7 and 8 and a thickened center 9. While the cushioning members are preferably made of rubber, they may be made of other material provided the desired cushioning effect is secured. As illustrated in Fig. 4, each cushioning member 6 is mounted on the frame 4 and may be held thereto by the action of the resiliency of the cushioning member or may be held in place by a suitable adhesive 10.

For each of the jars 5 there are provided a pair of supporting straps 10 and 11 riveted or otherwise rigidly secured to the frame 4 at the respective points 12 and 13. These straps are permanently fastened to the frame and remain constantly as shown for instance in Fig. 3. After the jar 5 has been placed in position, the strap 14 is swung into position. This strap is hinged at 15 to the frame 4 but at the point 16 it is adjustably connected to the frame 4. As illustrated particularly in Fig. 1, there are provided a pair of ears 17 and 18 preferably integral with the frame 4. Strap 14 has a threaded member 19 connected thereto by any desired means, as for instance, rivet 20 extending through the enlargement 21 and through the strap 14. A wing nut 22 is screwed on to the end of the threaded member 19 and this wing nut presses against the ears 17 and 18 and thereby pulls the strap 14 so that this strap will press downwardly on the jar 5, as shown in Fig. 3, and press this jar tightly against straps 10 and 11. This will normally hold the jar in proper position but it has been found that sometimes there will be a certain movement of the jar which will cause the jar to strike the frame 4 and become injured or broken.

As illustrated in Figs. 1 and 2, there are provided four cushioning members 6, there being one member on each side of the strap 14. As shown in the accompanying drawing, these cushioning members are so proportioned that when jar 5 is inserted it must be forced into position as shown in Fig. 3. However, the cushioning members or bumpers and other parts may be so proportioned that when the jar 5 is inserted it must be forced into position as shown in Fig. 3. However, the cushioning members or bumpers and other parts may be so proportioned that when the jar is inserted it will barely touch or possibly not touch the bumpers. These bumpers act to prevent any breakage or injury to the jar when being inserted into position as well as prevent any breakage by reason of the independent movement of the jar after being carefully placed in the frame. Therefore, it will be seen that the cushioning members act in several capacities, as for instance as bumpers, centering member, and resilient guiding members for guiding the jar into place when the same is first inserted. While the cushioning members may prevent independent movement of the jar, the primary object is to cushion or absorb any movement after the jar is in place or to prevent injury to the jar while being placed in position.

The straps 10, 11 and 14 are preferably metal straps and, consequently, will stretch very little but any stretch may be readily taken up by the nut 22. While four cushioning or bumper members have been shown, it will be evident that more or even less could be used without departing from the spirit of the invention. Also cushioning or bumper members could be arranged on the bracing bar 23 and also on the end bar 24 to prevent injury by any accidental longitudinal movement. Ordinarily the cushioning or bumper members are not necessary at the ends but are very desirable on the two side bars of the frame 4. The arrangement, as shown in Fig. 1, is usually the most desirable and if the frame 4 should be longer and accommodate more jars, there would be four cushioning members for each pair. Under some circumstances the cushioning members could cover the entire inner surface of the frame 4. When the cushioning members 6 are of the same size and arrangement as shown in Fig. 3, they will have a tendency to maintain the jar 5 centered between the respective longitudinal side bars of the frame 4. However, if desired, one of the cushioning members could be thicker than the other and, therefore, resiliently hold the bar off center so that it will operate eccentrically for grinding certain materials. This off-center position of the jars may be desirable under some circumstances but for most materials the concentrically positioned jar is desired.

I claim:

1. In a jar mill of the character described, a frame formed of substantially T-shaped material, a strap for clamping a jar in said frame, a plurality of cushioning members mounted in said frame between said jar and said frame for cushioning said jar, each of said cushioning members being formed of rubber and provided with a thickened center portion and hook-shaped end portions, said end portions fitting over the edges of said frame, with the thickened portions positioned to contact the inner flat side of the frame opposite the web of the frame and adhesive for connecting the cushioning member to the frame so as to prevent any independent longitudinal movement thereof.

2. A jar mill having a frame provided with diametrically opposed parallel bars, a strap connected with said frame for clamping a jar in the frame, a plurality of rubber cushions, each cushion having a flat straight inner surface fitting flatwise against one surface of one of said bars and a substantially arc-shaped surface opposite the flat surface extending toward said jar and a pair of hook-shaped ends having their extremities overlapping and arranged parallel to said flat surface so as to straddle the sides of a bar of said frame, said cushions being positioned on said bars so as to act in opposite directions with the arc-shaped surfaces adapted to press against said jar, and means acting on said strap for causing said strap to press said jar against said cushions.

3. A jar mill having a frame formed with a pair of diametrically oppositely positioned bars, each of said bars having a flat inner surface and at the longitudinal center on the opposite surface a bracing web facing radially outwardly, a resilient cushioning member mounted on each of said bars for resiliently centering a jar, said cushioning members being on diametrically opposite sides of a jar in the mill, each cushioning member being formed of material having the characteristic of rubber and provided with a center part flat and straight on the inner surface of said bars and end parts formed hook-shaped positioned to fit over the opposite side edges of the bars, the center part being thicker than the remaining part and arc-shaped on the outer surface, each cushioning member being approximately twice as long as it is wide.

HENRY F. KLEINFELDT.